United States Patent [19]

Kronenberg

[11] Patent Number: 4,893,017

[45] Date of Patent: Jan. 9, 1990

[54] DOSE AND DOSE RATE SENSOR FOR THE POCKET RADIAC

[75] Inventor: Stanley Kronenberg, Skillman, N.J.

[73] Assignee: The United State of America as represented by the Sectretay of the Army, Washington, D.C.

[21] Appl. No.: 260,425

[22] Filed: Oct. 14, 1988

[51] Int. Cl.[4] ............................................... G01T 3/08
[52] U.S. Cl. ......................... 250/370.07; 250/370.06; 250/370.05
[58] Field of Search .................. 250/370.07, 370.06, 250/370.05, 484.1 C; 357/29

[56] References Cited

U.S. PATENT DOCUMENTS 3,129,329  4/1964  Love et al. ..................... 250/370.06
4,516,028  5/1985  Riggan ........................... 250/370.07

Primary Examiner—Janice A. Howell
Assistant Examiner—Richard Hanig
Attorney, Agent, or Firm—Michael Zelenka; James J. Drew

[57] ABSTRACT

A radiation detector which registers the radiation absorbed during the Prompt Initial Radiation (PIR) phase following the detonation of a battlefield nuclear device is disclosed. The dose and dose rate attributable to gamma rays may be measured when the dose rate is low, and the total dose attributable to neutron and gamma ray radiation can be determined separately when the dose rate is high. Two silicon photodiodes are arranged on opposite sides of a slab of polyethylene to gather protons scattered by the incident neutron flux. A third photodiode is set next to a slab of silicon such that its depleted layer is surrounded by silicon. All three diodes are sensitive to gamma ray radiation. When the dose rate is low, the three diodes gather gamma ray dose information. When the dose rate is high, the two diodes adjacent to the polyethylene register combined neutron and gamma ray dose information while the remaining diode registers predominantly gamma ray dose information. Analog to digital converters are used to change the analog signals from the diodes to digital signals appropriate for a microprocessor. These digital signals can be combined with dose data stored in the microprocessor to determine gamma ray dose rates and neutron and gamma ray doses.

7 Claims, 1 Drawing Sheet

DOSE AND DOSE RATE SENSOR FOR THE POCKET RADIAC

The invention described herein may be manufactured, used, and licensed by or for the Government of the United States for governmental purposes without the payment to me of any royalties thereon.

FIELD OF THE INVENTION

The present invention relates generally to radiation detectors, and more particularly to small gamma ray and neutron dosimeters useful in measuring radiation on the nuclear battlefield.

BACKGROUND OF THE INVENTION

Tactical nuclear weapons produce high intensity Prompt Initial Radiation (PIR) which consists of gamma rays and fast neutrons. This PIR is followed in time by gamma rays from the radioactive fallout. The environment of strategic nuclear weapons is quite different, because in that case the radius of total destruction by blast and shock is larger than the range of the PIR. Thus, if we concentrate only on radiation from strategic nuclear weapons, only fallout is important.

These circumstances determine the main operational requirements for an all purpose miniaturized radiation meter (radiac) for use by soldiers on a tactical nuclear battlefield. These requirements are:

(A) The gamma ray and fast neutron doses should be measured and displayed separately within the range of 0.01 to 10 Gray (tissue) when delivered at dose rates between $3 \times 10^{-9}$ Gray per second and $10^{10}$ Gray per second. The required accuracy is plus or minus 20 percent or plus or minus 0.2 Gray, whichever is greater.

(B) The ambient dose rate (of gamma rays only) should be measured in real time within the limits of $3 \times 10^{-9}$ Gray per second and $3 \times 10^{-1}$ Gray per second with an accuracy of plus or minus 20 percent.

(C) The instrument should respond to fast neutrons and to gamma rays of quantum energies above 80 keV.

A practical radiac would have to meet these requirements and be small, lightweight, rugged, relatively inexpensive, and consume a minimum amount of power. Those concerned with the development of such radiacs have long recognized the need to address these and other related problems.

It is an object of the invention to provide a combination gamma ray and neutron dosimeter.

It is another object of the invention to provide a small, lightweight, rugged, relatively inexpensive radiac for the tactical nuclear battlefield which can operate on a minimum amount of power.

It is another object of the invention to provide a technique of analyzing the output of radiation detectors to determine the amount of gamma and fast neutron radiation absorbed within the detector material.

SUMMARY OF THE INVENTION

The present invention uses a triad of silicon photodetectors ("detectors") in a circuit to measure both the doses and dose rates of gamma and fast neutron radiation. The circuit is capable of responding to a mixed flux of high intensity, high energy neutrons and gamma rays. Gamma rays passing through a crystal of silicon produce electrons through Compton scattering or the photoelectric effect, or both. Neutrons passing through a block of polyethylene collide with and eject protons. The detectors are placed close to these blocks or slabs of silicon and polyethylene to interact with the electrons and protons produced by the gamma and neutron radiation. These detectors produce a signal when charged particles, electrons and protons, travel through the depleted layer of the detector and produce charge pairs which are swept into detecting circuits. The amount of such charge produced is analyzed to determine the amount of radiation absorbed.

BRIEF DESCRIPTION OF THE DRAWINGS

Further objects and advantages of the present invention will become apparent to those familiar with the art upon examination of the following detailed description and accompanying drawings, in which.

DETAILED DESCRIPTION

Figure 1:
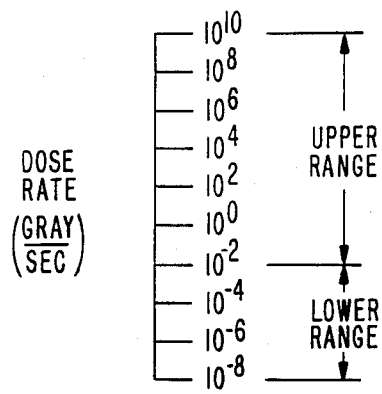
FIG. 1 is a chart illustrating the range of dose rates at which gamma and neutron dose and dose rate measurements are important for the purposes of the present invention.

Referring to the drawings, attention is first directed to FIG. 1 which illustrates the two different ranges over which the battlefield radiation detector must function. When radiation is absorbed in the upper range, that is at dose rates above 0.01 Gray per second, the radiac has to measure gamma ray dose and neutron dose separately in the dose range from 0.01 to 10 Gray. In the lower range, that is at dose rates below 0.01 Gray per second, only the gamma ray dose rate is of importance. At these dose rates, the neutron dose does not matter.

Figure 2:
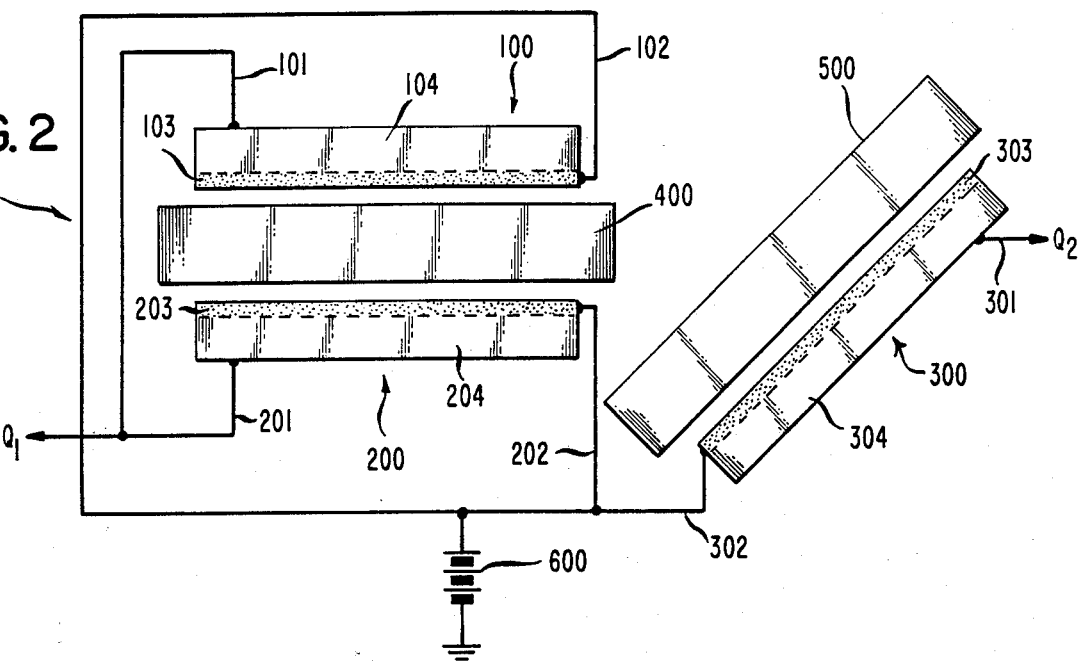
FIG. 2 is a schematic drawing of a radiac in accordance with the present invention.

In FIG. 2, reference numeral 20 designates generally the inventive radiation detector.

Three silicon photodiodes ("diodes") 100, 200, and 300 are assembled as shown in FIG. 2, to form the radiation sensor 20. Diodes 100 and 200 are spaced apart face each other and have a thick polyethylene layer 400 between them. The thickness of polyethylene layer 400 is approximately 3 mm. Polyethylene was chosen for this purpose, although other compounds rich in hydrogen are suitable, since detection of neutrons depends on detecting protons scattered by collisions with incident neutrons. Protons scattered by such collisions may enter diodes 100 and 200 and generate charge pairs in the depleted layers 103 and 203 of diodes 100 and 200, respectively. Leads 101 and 201 are connected together such that like charges produced in the depleted layers 103 and 203 of diodes 100 and 200, respectively, are collected and combined as total charge Q1. Diode 300 is mounted separately and silicon layer 500 is placed opposite the depleted layer 303 of diode 300. Lead 301 is connected to diode 300 to collect charge Q2 caused by the passage of electrons through the depleted layer 303 of diode 300. The thickness of silicon layer 500 is approximately 3 mm and serves to establish the Compton and photoelectric equilibrium. Silicon photodiodes 100, 200, and 300 are biased in reverse by voltage supply 600 with approximately 30 volts.

The operation of sensor 20 is divided into two separate ranges, as illustrated in FIG. 1.

The lower operational range serves to measure doses and dose rates for gamma radiation when the radiation intensity is below $10^{-2}$ Gray/sec. For this application, all three diodes 100, 200, and 300 are connected in parallel and thus perform as one photodiode with three times the sensitivity of a single photodiode. That is, by combining Q1 and Q2, the total gamma ray dose may be determined. The pulse rate caused by individual Compton-photoelectrons indicates the ambient dose rate. The total number of pulses indicates the accumulated dose delivered to the radiac during the time it was turned on. For a detailed description of this process and a discussion of the problems encountered when the dose measured in units of rads (detector material) differs from the dose measurement desired in units of rads (tissue) see the U.S. Pat. No. 4,859,853 "A Solid State Gamma Ray Dosimeter Which Measures Radiation in Terms of Absorption in a Material Different form the Detector Material", issued to Stanley Kronenberg, Aug. 22, 1989.

In the tactical nuclear weapon environment neutrons do not matter at dose rates below $10^{-2}$ Gray/sec; therefore, the dose or dose rate attributable to neutron radiation does not have to be monitored in the low intensity mode of operation.

Figure 3:
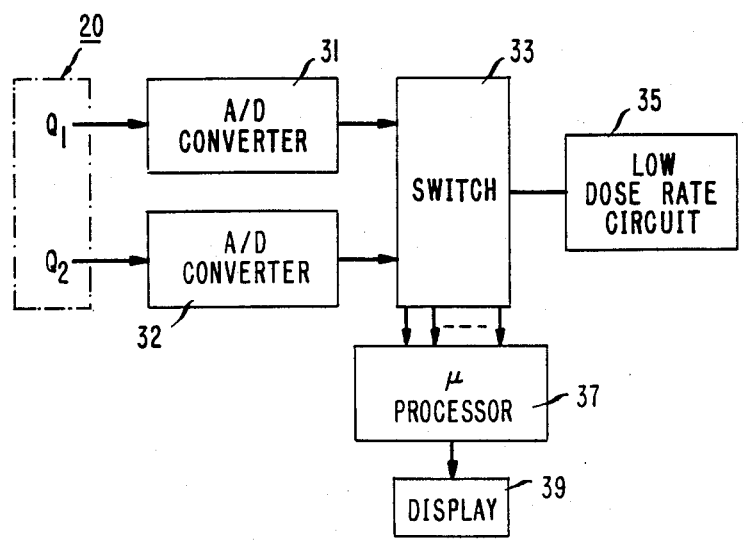
FIG. 3 is a circuit block diagram of a radiac in accordance with the present invention.

When the intensity exceeds $10^{-2}$ Gray/sec, the requirements do not call for monitoring the dose rate. Only the total dose is of interest. FIG. 3 shows charge outputs Q1 and Q2 of sensor 20 being fed into analogue to digital converters 31 and 32, respectively. These analogue to digital converters 31 and 32 may be circuits which translate the amount of charge Q1 and Q2 collected in the sensor 20 to analogue signals proportional to Q1 and Q2 before converting them to digital signals. These digital signals will be analyzed in the microprocessor 37 according to the scheme detailed below. An electronic switch 33 senses the current output of the low dose rate circuit 35. Low dose rate circuit 35 can be any dose rate circuit sensitive to gamma radiation in the range covering the crossover dose rate around $3 \times 10^{-3}$ Grays per second, or the circuit illustrated in FIG. 2 where Q1 and Q2 are combined to yield the total gamma ray induced charge, or the circuit described in the earlier cited patent application of Kronenberg. The output of this low dose rate circuit 35 will be a digital signal proportional to the dose absorbed at the low dose rate and in a form acceptable to the microprocessor 37. The switch 33 disconnects the low dose rate circuit 35 when the dose rate exceeds the crossover rate and channels the digital outputs of the analogue to digital converters 31 and 32 into the microprocessor 37. When the circuit of FIG. 2 is used as the low dose rate circuit 35, Q1 and Q2 are combined and treated by switch 33 as the input from low dose rate circuit 35. When the dose rate rises above the threshold, switch 35 separates the inputs into Q1 and Q2.

While at intensities below $3 \times 10^{-3}$ Grays/sec individual pulses are counted, at higher intensities the total charge released by the incident ionizing radiation is collected and analyzed to determine the total dose absorbed.

Gamma rays and x-rays do not produce a signal directly in the depleted region of silicon photodiodes. They produce Compton electrons or photoelectrons, or both, which create charge pairs, electrons and holes, when they go through the depleted layer of the detector. Energetic electrons which originate in the depleted layer as well as outside of it may contribute to the signal. For that reason, in diodes 100, 200, and 300 the depleted layers 103, 203, and 303, respectively, are surrounded in each case by an electron equilibrium layer 104, 204, and 304. This so-called "cladding" insures that scattered electrons which enter the various depleted layers originated from interactions within detector material, in this case, silicon. The thickness of the equilibrium layer should be less than the range of gamma rays in the material to insure that the detectors respond to the total gamma ray flux, yet be greater than the range of electrons which might enter the material. For diode 100, electron equilibrium layers 104 and 204 effectively surround the diode 100, and for diode 200, these same electron equilibrium layers 104 and 204 effectively surround diode 200. For this reason, diodes 100 and 200 can be considered a single gamma ray detecting unit, whose output Q1 reflects the gamma ray dose absorbed in the detector material, here silicon. The electron equilibrium layer 104, 204, and 304 is the bulk silicon of diodes 100, 200, and 300 respectively. Diode 300 is effectively surrounded by silicon since a block of silicon 500 is mounted atop diode 300. Thus the electric charge liberated in the depleted layers of the diodes 100, 200, and 300 is proportional to the gamma ray dose in terms of the equilibrium layer, or cladding, materials.

Consider now the interaction of incident neutrons with the hydrogen nuclei (protons) in the polyethylene layer 400. Since the proton and the neutron have approximately equal masses, the velocity the proton obtains when struck by a neutron, assuming an elastic collision, is:

$$V_p = V_n \cos\alpha \qquad (1)$$

where $V_p$ is the velocity of the struck proton, $V_n$ is the velocity of the incident neutron, and $\alpha$ is the scattering angle.

The proton energy (in the nonrelativistic case which applies here) is:

$$E_p = \tfrac{1}{2} m_p V_p^2 = \tfrac{1}{2} m_p V_n^2 \cos^2\alpha \qquad (2)$$

where $m_p$ is the proton mass, and $E_p$ is the kinetic energy of the struck proton.

We see that the thin depleted layers 103 and 203 adjacent to the ployethylene layer 400 sample the energy of the emerging recoil protons and that the output of the two detectors due to neutrons is the same as if there were only one very thin detector embedded in polyethylene. For thin depleted layers, the Bragg-Gray principle applies and thus the combined output of the two detectors due to neutrons will be proportional to the neutron dose expressed in Gray (polyethylene). The dose measured in Gray (polyethylene) is close to Gray (tissue). Further, the contribution to the signal from interactions other than neutron-proton elastic scattering is small. For example, if 1 MeV neutrons were absorbed directly in the silicon of the detector, the amount of radiation absorbed would be less than one-sixtieth the amount absorbed in tissue or polyethylene. Likewise, if 14 MeV neutrons were absorbed directly in the silicon of the detector, the amount of radiation absorbed would be about one fifth the amount absorbed in tissue or polyethylene. Specifically:

for 1 MeV neutrons: 1 Gray (Silicon) = 67.5 Gray (tissue)

for 14 MeV neutrons: 1 Gray (Silicon) = 5 Gray (tissue)

If we assume that, for gamma rays, 1 Gray (tissue) is about equal to 1 Gray (silicon), the electric charge signal Q1 from the diodes 100 and 200 will be approximately:

$$Q_1 \alpha 2D_\gamma + D_n \qquad (3)$$

where $D_\gamma$ is the gamma ray dose in tissue and $D_n$ is the neutron dose in tissue. Q1 is independent of the angular distribution of the neutrons.

The charge output Q2 of diode 300 will be:

$$Q_2 \alpha D_{65} \qquad (4)$$

From equations (3) and (4) the microprocessor 37 of FIG. 3 can calculate the respective gamma and fast neutron doses.

The problem can be solved more accurately using the more general equations:

$$Q_1 = S_{1\gamma}D_\gamma + S_{1n}D_n \qquad (5)$$

$$Q_2 = S_{2\gamma}D_\gamma + S_{2n}D_n \qquad (6)$$

where $D_\gamma$ and $D_n$ are the unknown quantities and $S_{1\gamma}$, $S_{2\gamma}$, $S_{1n}$, and $S_{2n}$ are the gamma and neutron sensitivities of the two detector assemblies. These sensitivities can be obtained experimentally, for instance, by exposing the detector assemblies to known gamma and neutron doses and measuring the charges Q1 and Q2 collected. These data and the equations (3) and (4), or (5) and (6) which manipulate the data can be stored in microprocessor 37 as dose data. The inputs to microprocessor 37 from the analogue to digital convertors 31 and 32 can be combined with the dose data within microprocessor 37 to produce dose and dose rate measurements consistent with the requirements of the tactical nuclear battlefield.

Obviously many modifications and variations of the present invention are possible in the light of the above teachings. It is therefore to be understood that, within the scope of the appended claims, the invention may be practiced otherwise than as specifically described.

What is claimed is:

1. A radiation detector for detecting gamma and neutron radiation at high dose rates comprising a first silicon photodiode, a second silicon photodiode, a third silicon photodiode, biasing means, a slab of silicon and a slab of polyethylene, said first and second silicon photodiodes being reverse biased by said biasing means and positioned on either side of said slab of polyethylene such that the depleted layer of each of said first and second silicon photodiode is adjacent said slab of polyethylene, said third silicon photodiode being reverse biased by said biasing means and positioned next to said slab of silicon such that the depleted layer of said third silicon photodiode is adjacent said slab of silicon, the outputs of said first and second silicon photodiodes being combined to yield a first analog signal proportional to the neutron dose and gamma ray dose absorbed by said first and second silicon photodiodes, and the output of said third silicon photodiode yielding a second analog signal proportional to the gamma ray dose absorbed by said third silicon photodiode.

2. The detector defined in claim 1 wherein the thickness of said slab of silicon and the thickness of said silicon photodiodes is sufficient to insure that electrons which liberate charge pairs in each of said depleted layers resulted from the interaction of said gamma radiation with silicon.

3. The detector defined in claim 1 wherein the thickness of said slab of silicon and the thickness of said slab of polyethylene is substantially three millimeters.

4. The detector defined in claim 1 further comprising microprocessing means adapted to accept said first analog signal and said second analog signal and translate said signals into digital outputs disclosing the amount of gamma ray and neutron radiation absorbed.

5. A high dose rate circuit for measuring the dose absorbed from gamma and neutron radiation at high dose rates, comprising a neutron/gamma detection circuit, a gamma ray detection circuit, a first and a second analog to digital interface, and a microprocessor, said neutron/gamma detection circuit comprising a first pair of reverse biased silicon photodiodes, each said photodiode of said first pair having a depleted layer interposed between a slab of silicon on one side and a slab of polyethylene on the other, said first pair of photodiodes being responsive to both gamma ray induced electrons and neutron induced protons, and said first pair of photodiodes having a first analog output proportional to both neutron dose and gamma ray dose, said gamma ray detection circuit comprising a second pair of reverse biased silicon photodiodes, each said photodiode of said second pair having a depleted layer surrounded by a slab of silicon on either side of said layer, the thickness of each said slab of silicon being sufficient to insure that electrons which liberate charge pairs in each of said depleted layers resulted from the interaction of said gamma radiation with one of said silicon slabs, One silicon photodiode of said second pair of silicon diodes being responsive to gamma ray induced electrons and having a second analog output proportional to the gamma ray dose, the other one of said second pair of silicon diodes being said neutron/gamma detection circuit, said first analog signal being the input to a first analog to digital interface which converts said first analog signal to a first digital signal acceptable to said microprocessor, said second analog output being the input to a second analog to digital interface which converts said second analog output to a second digital signal acceptable to said microprocessor, said microprocessor accepting said first digital signal and said second digital signal as inputs and determining the neutron dose and the gamma ray dose absorbed by the detector by applying the following algorithms:

$$Q_1 = S_{1\gamma}D_\gamma + S_{1n}D_n \qquad (1)$$

and $$Q_2 = S_{2\gamma}D_\gamma + S_{2n}D_n \qquad (2)$$

where $D_\gamma$ and $D_n$ are the gamma ray dose and the neutron dose, respectively, and $S_{1\gamma}$, $S_{1n}$, $S_{2\gamma}$, and $S_{2n}$ are the gamma and neutron sensitivities of the said first pair of silicon diodes and the gamma and neutron sensitivities of the said second pair of silicon diodes, respectively.

6. A radiation detector comprising a pair of silicon photodiodes spaced a predetermined distance from each other, a slab of polyethylene of selected thickness positioned between said silicon photodiodes, means for interconnecting the outputs of said pair of silicon photodiodes, a third silicon photodiode positioned proximate to said pair of photodiodes, a slab of silicon selectively placed adjacent said third silicon photodiode, means for reverse biasing said silicon photodiodes, and microprocessing means responsive to the combined output of said pair of photodiodes and to the output of said third photodiode to provide separate and distinct indications of the gamma ray and neutron radiation absorbed.

7. A detector as defined in claim 6 wherein said slabs of polyethylene and silicon are substantially three millimeters in thickness.

* * * * *